United States Patent
Dakroub

(10) Patent No.: US 10,351,058 B2
(45) Date of Patent: Jul. 16, 2019

(54) MANAGING ALERTS FOR A WEARABLE DEVICE IN A VEHICLE

(71) Applicant: Husein Dakroub, Dearborn Heights, MI (US)

(72) Inventor: Husein Dakroub, Dearborn Heights, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 15/094,593

(22) Filed: Apr. 8, 2016

(65) Prior Publication Data

US 2017/0291542 A1    Oct. 12, 2017

(51) Int. Cl.
| B60Q 1/00 | (2006.01) |
| B60Q 9/00 | (2006.01) |
| G08B 6/00 | (2006.01) |
| G08G 1/00 | (2006.01) |
| H04W 4/80 | (2018.01) |
| H04W 4/40 | (2018.01) |
| G08G 1/16 | (2006.01) |

(52) U.S. Cl.
CPC ............... *B60Q 9/00* (2013.01); *B60Q 9/008* (2013.01); *G08B 6/00* (2013.01); *G08G 1/205* (2013.01); *H04W 4/40* (2018.02); *H04W 4/80* (2018.02); *G08G 1/166* (2013.01); *G08G 1/167* (2013.01); *G08G 1/168* (2013.01)

(58) Field of Classification Search
CPC .................................. G06F 1/00; H04N 1/00
See application file for complete search history.

(56) References Cited

U.S. PATENT DOCUMENTS

| 2010/0117869 A1* | 5/2010 | Rieth ..................... G08G 1/205 340/989 |
| 2010/0164752 A1* | 7/2010 | Stahlin ............. G08G 1/096716 340/905 |
| 2015/0081169 A1 | 3/2015 | Pisz |
| 2015/0149018 A1 | 5/2015 | Attard et al. |
| 2015/0365979 A1 | 12/2015 | Park |
| 2016/0007912 A1* | 1/2016 | Hu ........................ A61B 5/002 600/595 |
| 2016/0272215 A1* | 9/2016 | Laine .................... B60W 50/14 |
| 2017/0072876 A1* | 3/2017 | Rajan ................. G06F 13/4282 |
| 2017/0083591 A1* | 3/2017 | Francis ............ G06F 17/30554 |

FOREIGN PATENT DOCUMENTS

| CN | 104527548 A | 4/2015 |
| CN | 104950728 A | 9/2015 |
| EP | 3 141 438 A1 | 3/2017 |
| WO | 2015/170821 A1 | 11/2015 |
| WO | 2017/078689 A1 | 5/2017 |
| WO | 2017/131814 A1 | 8/2017 |

* cited by examiner

*Primary Examiner* — Shirley Lu
(74) *Attorney, Agent, or Firm* — Dickinson Wright PLLC

(57) ABSTRACT

A method, system, and a variety of electronic circuits are provided herein that manage advanced driver assistance systems (ADAS) for passengers in a vehicle wearing a wearable device. The aspects disclosed herein allow the passenger/occupant/driver to receive ADAS messages/alerts, and receive haptic, video, audio notifications providing the same. As such, the passenger/occupant/driver is notified by the ADAS message in a passive manner.

19 Claims, 8 Drawing Sheets

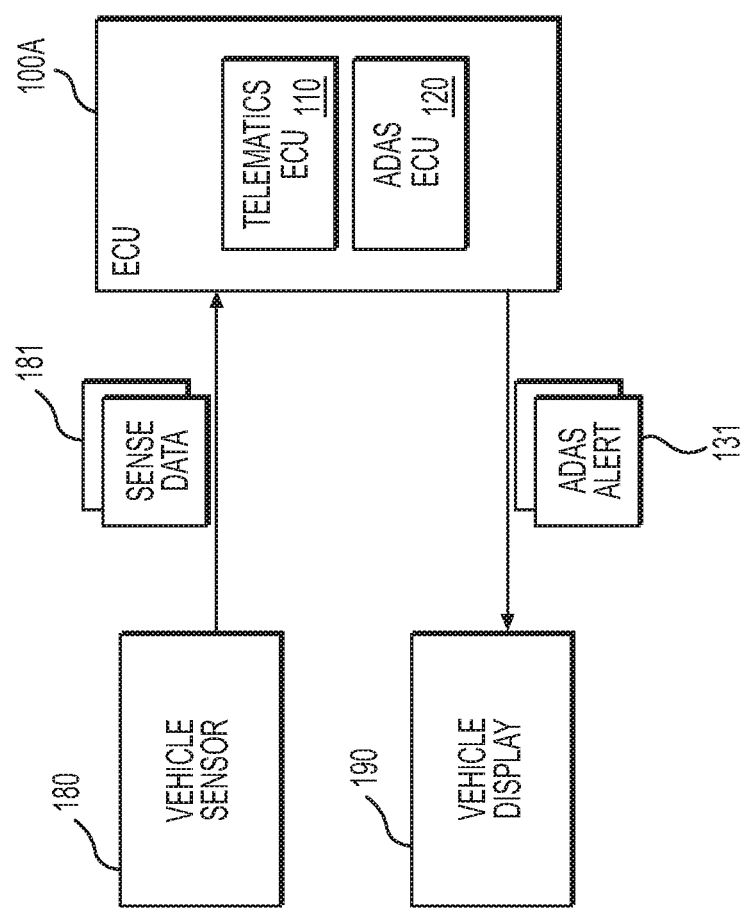

MANAGING ALERTS FOR A WEARABLE DEVICE IN A VEHICLE

BACKGROUND

Electronic devices are becoming more mobile and interconnected. In recent years, smart phones capable of conveying information from a network connection have become more popular and ubiquitous. As such, users are able to connect to a network, and obtain information in a real-time fashion, while communicating with others as well.

Another portable/mobile type of technology device are wearable technology devices (or just wearable devices). Wearable technology devices are electronic devices communicable (for example, wirelessly) to other electronic devices. Several examples of wearable technology devices are a smart watch, electronic rings, electronic bracelets, and the like.

These devices are equipped with wireless communication capabilities, and as such, may communicate with other electronic systems. Often times, the wearable technology device is coupled to a biometric function, and may detect an aspect of the wearer's physiology.

In other cases, the wearable technology device may be an information providing device, and be coupled to a network connection (e.g. a cloud storage device, satellite connection, wireless internet, short range communication protocol, or the like), and communicate the information to the wearer of the wearable technology device.

In recent years, the vehicle has become more electronic and interactive. Vehicle technology has been designed to incorporate various ideas and concepts associated with mobile computing and a connected vehicle.

For example, infotainment systems provided in a vehicle may be provided or installed in a vehicle cluster. The infotainment system may be configured to provide entertainment via a display, or alternatively, provide useful information about the vehicle's operation. The infotainment system may be configured to handshake with a mobile device, and share information to and from the driver or passenger. For example, media stored on the mobile device may be transmitted to the infotainment system.

When technology is implemented in the vehicular context, ensuring that information is conveyed in a safe manner is paramount. Further, ensuring that information associated with the safety and operation of the vehicle is also paramount.

For example, legal bodies have instituted standards for information that is required or encourage to be disseminated to drivers/passengers. The information usually pertains to critical functions of the vehicle and safety related alerts. One such standard/system is the advanced driver assistance system (ADAS).

ADAS are systems developed to automate/adapt/enhance vehicle systems for safety and better driving. Safety features are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate GPS/traffic warnings, connect to smartphones, alert driver to other cars or dangers, keep the driver in the correct lane, or show what is in blind spots.

SUMMARY

The following description relates to system, methods, and circuit devices related to the managing of alerts received by a wearable device in the vehicular context. Exemplary embodiments may also be directed to any of the system, the method, an application provided on an instrument cluster, electronic vehicle system, a wearable device, or the like.

Additional features of the invention will be set forth in the description which follows, and in part will be apparent from the description, or may be learned by practice of the invention.

A system for managing an alert for a wearable device in a vehicle is provided herein. The system includes a data store comprising a non-transitory computer readable medium storing a program of instructions for the managing of the alert; a processor that executes the program of instructions, the instruction comprising the following steps: receiving a message based on a sensed parameter associated with the vehicle; determining whether the message is an advanced driver assistance system (ADAS) alert type; in response to the message being of the ADAS alert type, generating an ADAS alert; transmitting the ADAS alert to the wearable device, the wearable device being worn by an occupant in the vehicle.

In another example, the system includes the following step of prior to transmitting the ADAS alert, determining whether the wearable device and the vehicle are in a pairing relationship; and in response to being in the pairing relationship, transmitting the ADAS alert, and in response to not being in the pairing relationship, not transmitting the ADAS alert.

In another example, the system includes a step of prior to transmitting the ADAS alert, determining whether the ADAS alert is predefined as a transmittable message, and in response to the ADAS alert being a predefined transmittable message, transmitting the ADAS alert, and in response to the ADAS alert being not a predefined transmitting message, not transmitting the ADAS alert.

In another example, the wearable device is defined to be worn on a wrist of the passenger.

In another example, the system includes a step of after receiving the ADAS alert, the wearable device is configured to provide a haptic notification.

In another example, the system includes a step of after receiving the ADAS alert, the wearable device is configured to provide a sound notification.

In another example, the system includes a step of after receiving the ADAS alert, the wearable device is configured to provide a visual notification.

Also disclosed herein is a system for embedding in a wearable device, to manage an alert message received from a vehicle's electronic system. The system includes a data store comprising a non-transitory computer readable medium storing a program of instructions for the managing of the alert message; a processor that executes the program of instructions, the instruction comprising the following steps: receiving a message from the vehicle's electronic system; determining whether message is of an advanced driver assistance system (ADAS) type; in response to the message being of the ADAS type, generating a notification via the wearable device, and in response to the message being not of the ADAS type, the system being placed in a state to receive a subsequent message.

In another example, the ADAS alert is generated in response to a deployment of an airbag, and the notification instigates a communication to a third-party.

In another example, the third-party is an emergency responder.

A method for receiving advanced driver assistance system (ADAS) type messages is also described herein. The method includes receiving an ADAS alert message via a wearable device worn by a passenger in a vehicle; determining whether ADAS alert message is of a predefined category; and in response to the ADAS alert message being of the predefined category, initiating a communication with a third-party.

In another example of the method, the predefined category includes a deployment of the vehicle's airbag.

In another example of the method, the third-party is an emergency responder.

It is to be understood that both the foregoing general description and the following detailed description are exemplary and explanatory and are intended to provide further explanation of the invention as claimed. Other features and aspects will be apparent from the following detailed description, the drawings, and the claims.

DESCRIPTION OF THE DRAWINGS

The detailed description refers to the following drawings, in which like numerals refer to like items, and in which.

DETAILED DESCRIPTION

Figure 1B:
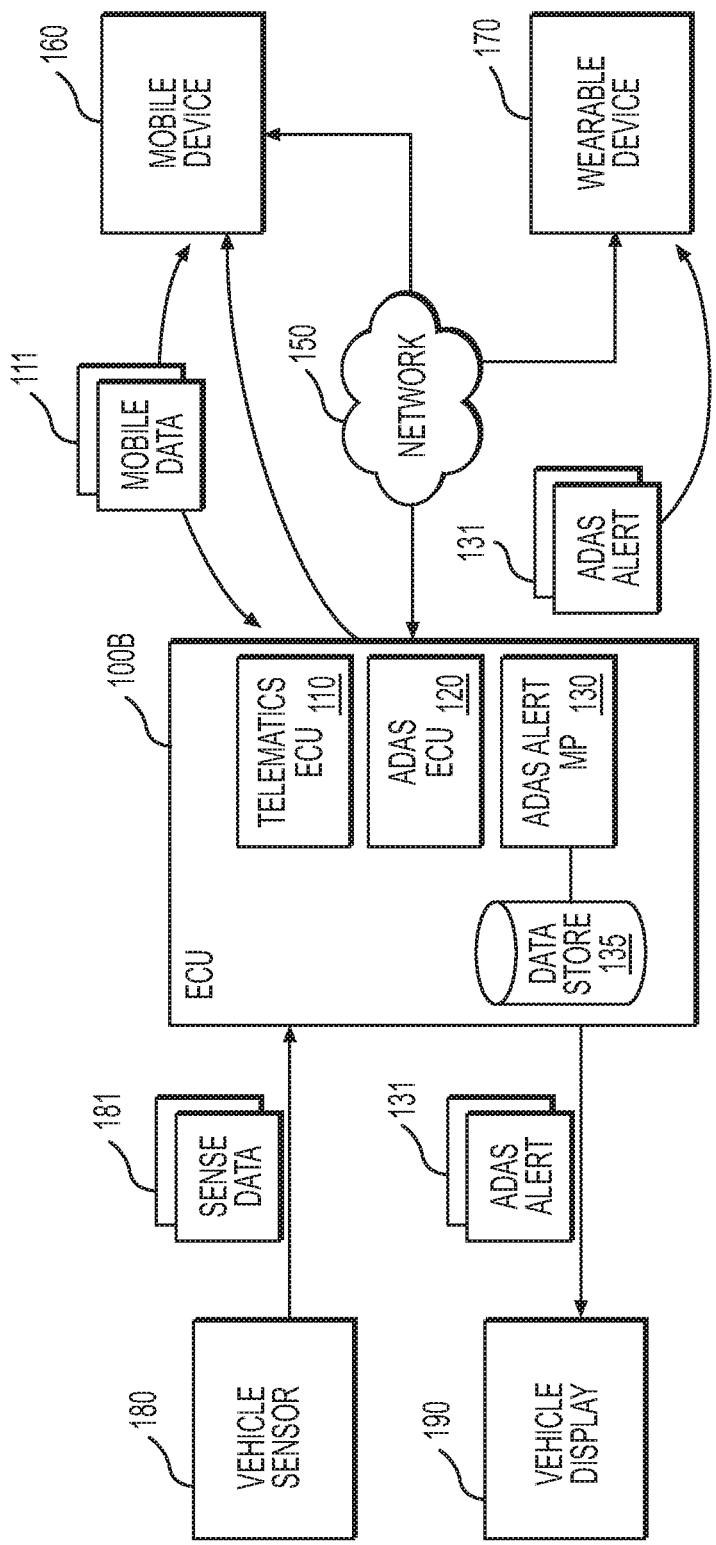
FIGS. 1(a) and (b) are system level diagrams illustrating an example of not-implementing the aspects disclosed herein, and implementing the aspects disclosed herein FIGS. 2(a) and (b) are examples of methods illustrating the operation of the ADAS alert microprocessor of FIG. 1(b).

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

As drivers, passengers and other occupants of a vehicle start carrying mobile devices on their person while occupying vehicles; the driving experience becomes more interactive. As explained in the Background section, vehicles have been equipped to more commonly be coupled communicatively with a variety of mobile devices, such as smart phones and the like.

However, having an unlimited access to information may be potentially dangerous, and in certain cases, lead to less driver awareness and carefulness. Thus, employing telemetric coupling from a vehicle electronic system to a second device may ultimately lead to a less ideal driving situation.

Disclosed herein are methods, systems, and electronic circuits configured to manage alerts for a wearable device in a vehicle. As explained in the Background section, wearable technology differs from a standard mobile device (i.e., a smart phone and the like), because the wearable technology is worn on the person's body. In this way, wearable technology is guaranteed to be able to provide a message via a haptic notification to a user, such as a driver, passenger, or occupant in a vehicle.

FIG. 1(a) illustrates an overview of an electronic topology of an electronic control unit (ECU) 100a implementing ADAS messaging.

As shown in FIG. 1(a), an ECU 100a is provided. The ECU 100a does not include the modifications associated with circuit modifications disclosed herein. The ECU 100a is coupled to one vehicle sensor 180. The number shown is merely exemplary, and one of ordinary skill in the art may implement any number based on a desired preference or system requirement. The vehicle sensor 180 may be any vehicular sensor capable of producing sensed data employed to generate an ADAS alert 131.

For example, the vehicle sensor 180 may be associated with a whole host of systems provided in a vehicle to promote safety, such as (but not limited to), blind spot monitoring, electronic warning systems, a pedestrian detection system, a forward collision warning, a traffic sign monitoring system, and the like. Thus, when the vehicle sensor 180 detects a sensed parameter, the vehicle sensor 180 communicates sense data 181 to the ECU 100a.

The ECU 100a includes a variety of sub-components, with each component contributing to a different function of the vehicle. The ECU 100a may include many sub-components not shown in FIGS. 1(a) and (b). Thus, for exemplary purposes, only the sub-components employed for the functionality of the disclosed concepts are shown.

For example, the telematics ECU 110 is shown. The telematics ECU 110 communicates wirelessly over a network 150, to a secondary device (for example, a mobile device 160 and/or a wearable device 170). The network 150 may be any short range wireless technique capable of interfacing two devices. In another example, the telematics ECU 110 may communicate to a third-party over a network connection such as the Internet, and the mobile device 160 and/or the wearable device 170 may communicate via the Internet as well. Thus, data packets may communicate from the telematics ECU 110 to the various secondary devices via an Internet connection.

While the telematics ECU 110 is exemplary shown, an alternate implementation allows for the wearable device 170 to pair with other ECU's in the vehicle, such as, but not limited to an infotainment ECU, which is a controller provided to operate an infotainment system in a vehicle.

Also shown is an ADAS ECU 120. The ADA ECU 120 is configured to receive sense data 181 from one of the sensors provided in a vehicle's ECU implementation, for example, vehicle sensor 180. If the sense data 180 indicates an ADAS alert is necessary, the ADAS alert 130 is then communicated to a vehicle display 190, in which an alert message is provided to a viewer of the vehicle display 190.

The vehicle display 190 may be any installed vehicle display in the context of the vehicle, such an infotainment system, a heads-up display (HUD), an instrument cluster panel, or the like.

FIG. 1(b) illustrates an example of the system shown in FIG. 1(a) modified to include an additional microprocessor configured to modify an existing ECU 100a to perform the aspects disclosed herein. Thus, FIG. 1(b) illustrates ECU 100b with ADAS alert microprocessor 130. Existing ECU's may be modified to include this microprocessor 130, or alternatively, the ECU 100b may be fabricated or manufactured to include this microprocessor 130 at an initial product delivery stage.

Similar to the system shown in FIG. 1(a), the ECU 100b includes a telematics ECU 110 with capabilities of handshaking and pairing with single or multiple devices, via network 150.

In the example shown in FIG. 1(b), a passenger/driver or occupant of the vehicle may bring in a mobile device 160. The mobile device 160 may be paired, and share various mobile data 111 with the ECU 110, via network 150, to the telematics ECU 110. In turn, the ECU 100b may use the mobile data 111 to either provide information to a user, for example, via the vehicle display 190, allow control of the vehicle, or perform other operations.

In another example, the ECU 100b may be communicatively coupled to the wearable device 170 through similar networking connections (i.e. via network 150). This communicative coupling provides an important aspect to the concepts disclosed herein.

In contrast to ECU 100a, ECU 100b now includes an ADAS alert microprocessor 130. The ADAS alert microprocessor 130 provides selective sharing of the ADAS alert 131 to secondary components provided in a vehicle. Similar to FIG. 1(a), the ADAS alert microprocessor 130, along with the ADAS ECU 120, communicates ADAS alerts, such as ADAS alert 131, to the vehicle display 190.

Additionally (also as not shown in FIG. 1(a)), due to the introduction of ADAS alert microprocessor 130, an ADAS alert 131 is also communicated (wirelessly) to the wearable device 170. As such, the wearable device 170 may instigate a notification, such as a haptic sensation or an audio/visual notification.

Figure 2A:
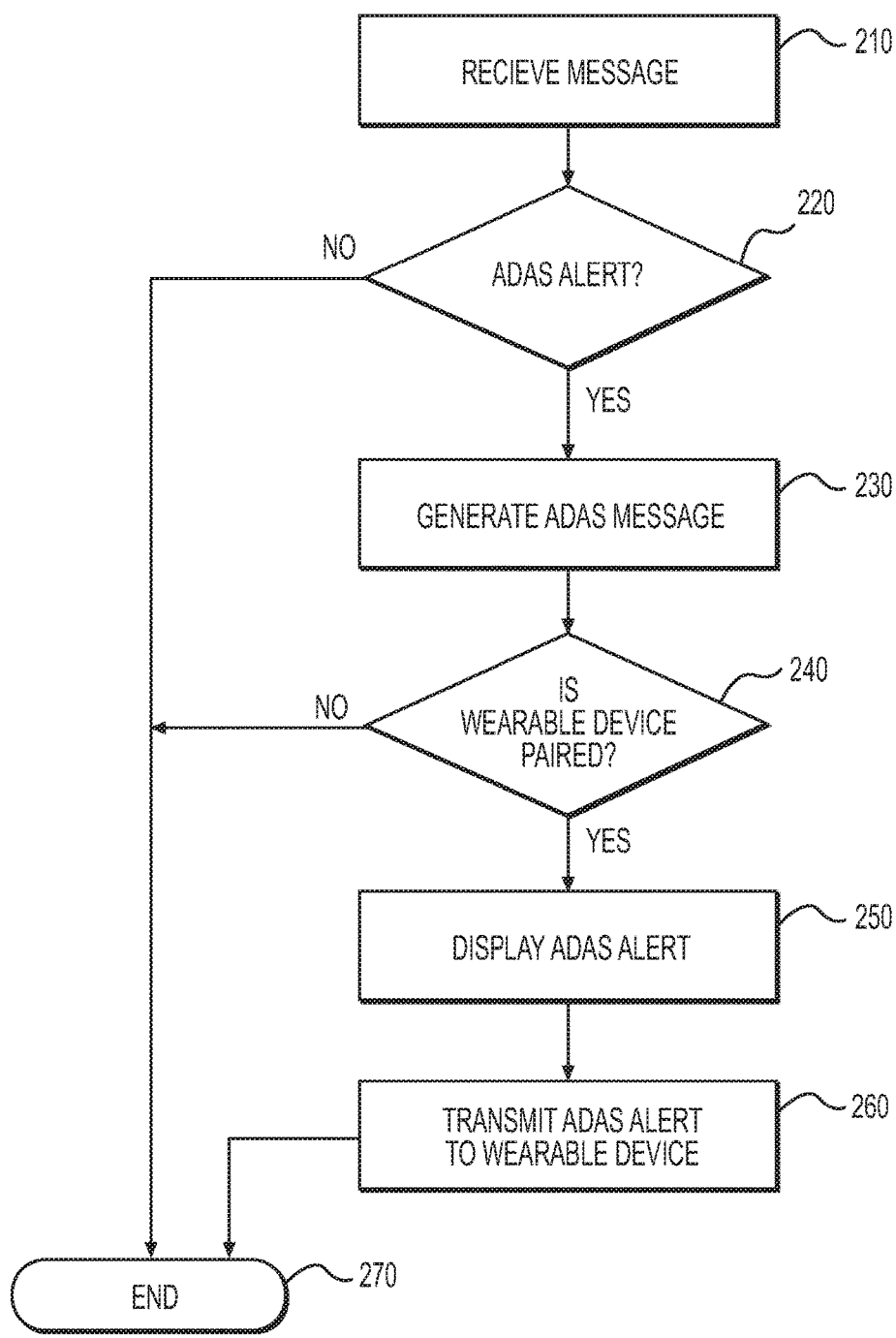

FIGS. 2(a) and (b) illustrate examples of methods 200a and 200b for implementing the ADAS alert microprocessor 130.

In operation 210, a message is received via the ECU 100b. The message may be earmarked for communication to one, some, or all of the components attached to the ECU 100b capable of providing an output (either in an audio, visual, or haptics manner). As such, the method 200a/b proceeds to operation 220.

In operation 220, a determination is made as to whether the message received is of an ADAS type. If yes, the method 200a/b proceeds to operation 230. If no, the method 200a/b proceeds to end (270).

In operation 230, the ADAS message (or alert) is generated. The message, as delivered to a secondary component (for example a vehicle's display) is constructed.

In operation 240, a determination is made as to whether a compliant wearable device is paired with the telematics ECU 110. By compliant, the wearable device is defined as being configured to receive and process ADAS alerts.

In operation 250, the ADAS alert 131 is communicated to the vehicle display 190. As such, the vehicle display 190 may notify the viewer of the vehicle display 190 about the ADAS alert 131 through a variety of techniques known to one of ordinary skill in the art.

As shown in FIG. 2(a), method 200a proceeds to operation 260. In operation 260, the ADAS alert 131 is communicated to the wearable device 170. The response of the wearable device 170 is described in greater detail below. The wearable device 170, for example, may vibrate or create a haptic sensation, provide a visual cue, audio cue, or a combination thereof. As such, the wearer of the wearable device 170 may be made aware of the ADAS alert 131 without having to avert their eyes from the road (i.e. in a situation where the ADAS alert 131 is communicated to a mobile device 160). Further, because the wearable device 170 is always worn (and not selectively on the person, like a mobile device 160), the wearer is guaranteed to be made aware of the ADAS alert 131.

Figure 2B:
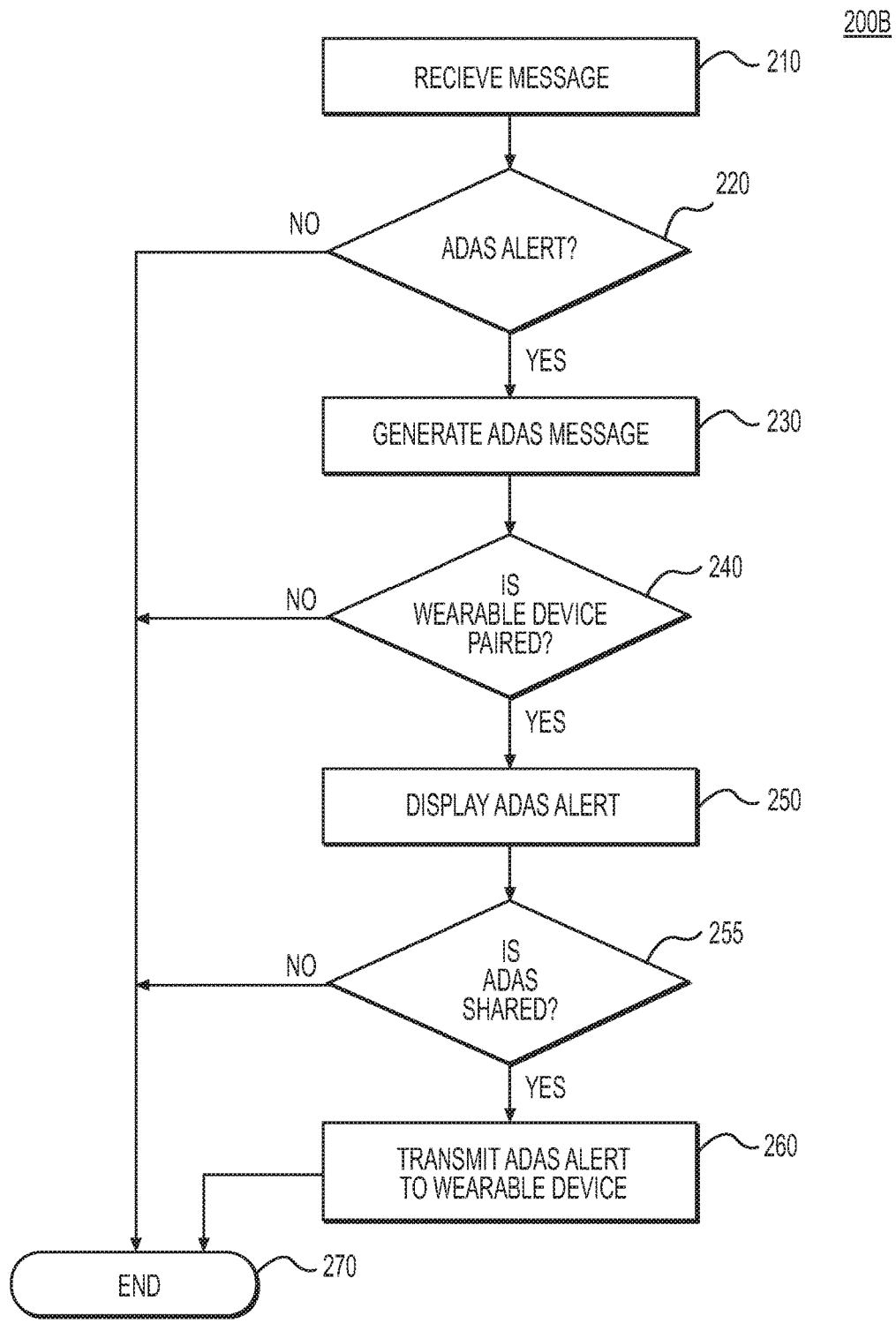

In FIG. 2(b), a difference between method 200a and b is highlighted with operation 255. In operation 255, a further determination is performed in whether the specific ADAS alert 131 is included in a predetermined list to be communicated to a wearable device 170 (such as stored in data store 135). If so, the method 200b proceeds to operation 260 (as described above). If not, the method 200b proceeds to end (270).

Figure 3A:
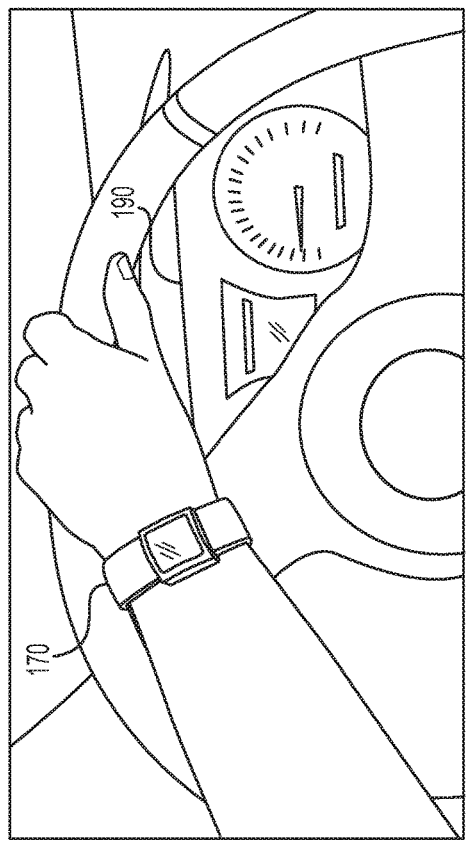
FIGS. 3(a)-(c) illustrate one example use case of the system described in FIG. 1(b).
Figure 3C:
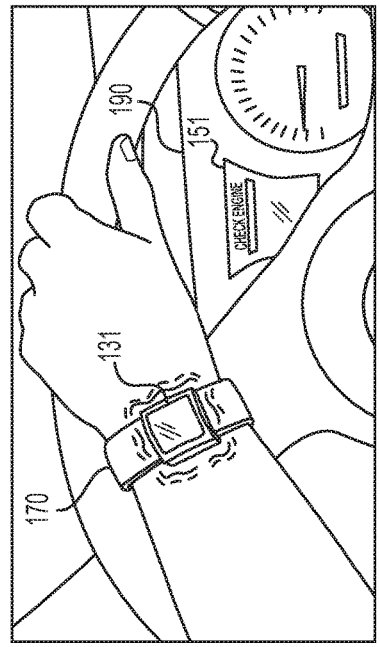
Figure 3B:
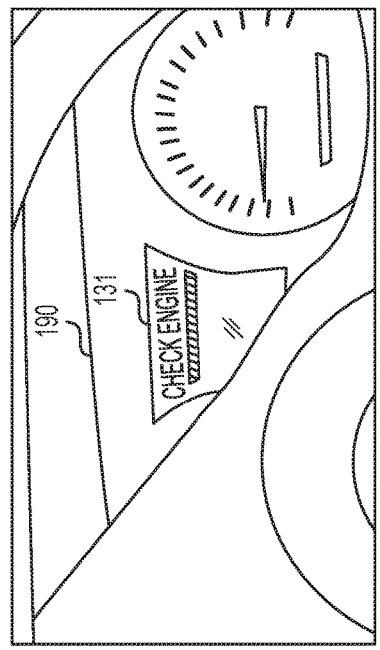

FIGS. 3(a)-(c) illustrate an example of the system and methods described in FIGS. 1(b), 2(a), and (b).

As shown in FIG. 3(a), a driver is wearing a wearable device 170 on their arms. Also shown is an instrument cluster with a vehicle display 190.

In FIG. 3(b), an ADAS alert 131 is generate according to the system 100a/b shown above. As such, because the systems 100b is implemented in the setup shown in FIGS. 3(a)-(c), an ADAS alert 131 is at least shown on the vehicle display 190 (i.e. the 'Check Engine' light). As discussed above, any ADAS alert 131 may be implemented with the system 100b (or methods 200a or b).

In FIG. 3(c), according to the aspects disclosed herein, a user is notified by the ADAS alert 131 via a haptic notification. The haptic notification may be augmented with other notifications that are not haptic, such as video, audio, text, or a combination thereof.

While the check engine alert is exemplary shown, other alerts and contexts may also be advantageously provided. For example, more vehicles are now becoming autonomous, or semi-autonomous. Thus, if a user is in one of these modes, the wearable device 170 may be instigated to provide a notification based on being in the mode, and further, being a predefined notification that may be useful to a passenger/driver/occupant.

For example, the notification may alert the wearer of the wearable device 170 that they are at or near a location around their destination. In another example, the ADAS alert 131 may be a notification of a low battery, or any sort of failure notified by the transmission of an ADAS alert 131.

Figure 4:
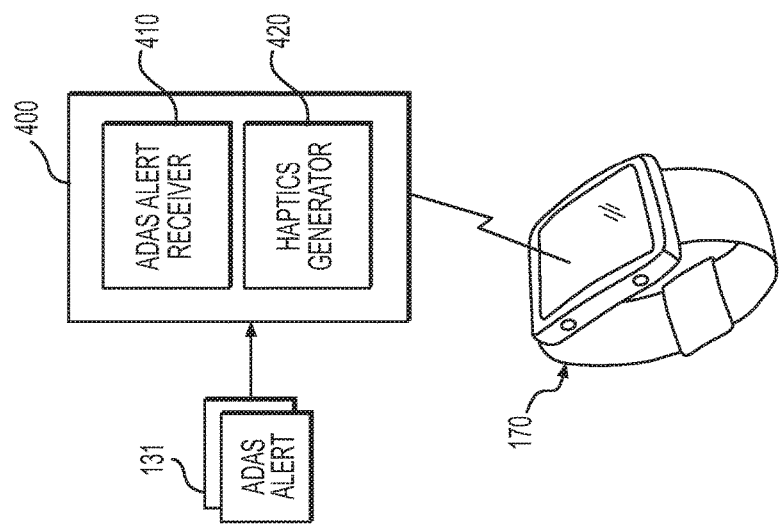
FIG. 4 illustrates an example of a system embedded in a wearable device according the aspects disclosed herein.

FIG. 4 illustrates an example of a system 400 for implementing the aspects disclosed above with a different configuration. In FIG. 1(b), the determination of a message being done is performed solely on the server-side (i.e. the vehicle's electronic system). A key difference in FIG. 4 is that the determination is performed in an electronic system encoded in the wearable device 170.

As shown in FIG. 4, the system 400 includes an ADAS alert receiver 410 and a haptics generator 420. The ADAS alert receiver 410 is configured to receive all messages from a telematics ECU 110 that is paired with the wearable device 170. The ADAS alert receiver 410 is further configured to determine whether the message received is of an ADAS type (i.e. an ADAS alert 131). If the message is an ADAS alert, the haptics generator 420 is configured to initiate a haptic notification.

Figure 5:
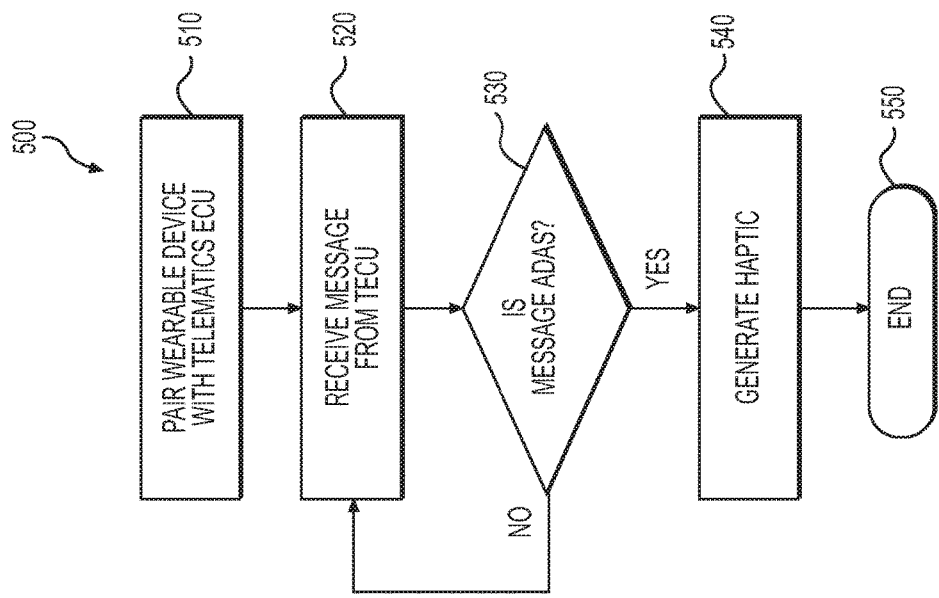
FIG. 5 illustrates a method explaining the system of FIG. 4.

FIG. 5 illustrates this concept further via method 500. The method 500 may be implemented in a circuit configured implementation of system 400.

In operation 510, the wearable device 170 is paired with a telematics ECU 110. Operation 510 may be implemented with a variety of alternate embodiments. In one example, the pairing may already be established. In another example, the pairing may occur in response to the transmission of an ADAS alert 131.

Once the devices are paired, the wearable device 170 is configured to receive messages from the telematics ECU 110. In some cases, the messages may range from standard communication messages, like text messages, downloaded content, and the like. However, in operation 530, a determination is made as to whether messages are ADAS alerts. If no, the method 500 proceeds iteratively to operation 520, and the system 400 is configured to wait for an additional message.

If yes, the wearable device 170 is configured to generate a haptic notification 540 (or other type of notifications mentioned above), thereby alerting the wearer of the wearable device that an ADAS alert 131 has been received.

Figure 6:
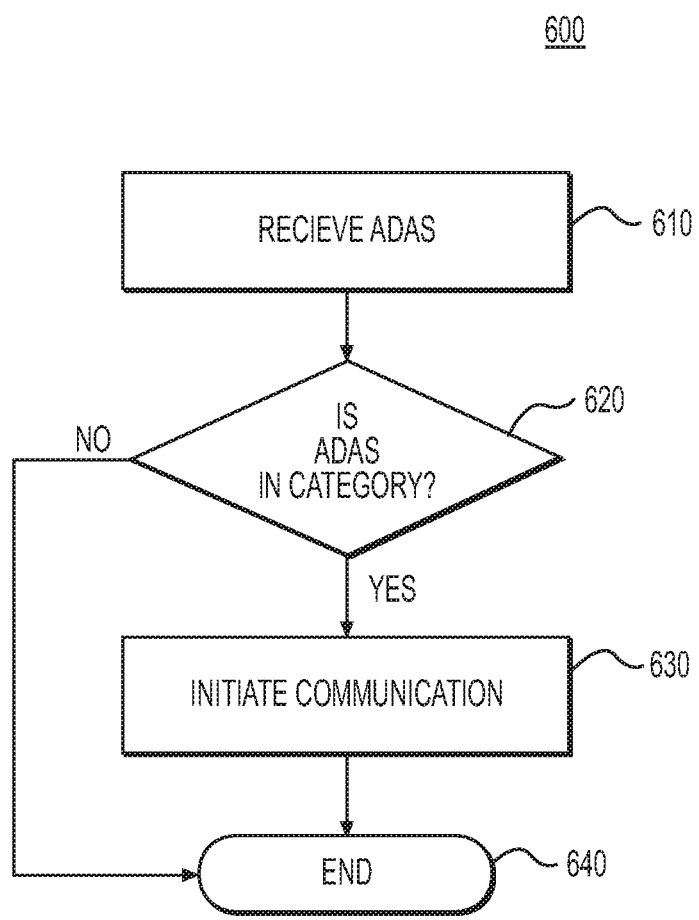
FIG. 6 illustrates another example of a method employing the aspects disclosed herein.

Various alternative embodiments may be provided in addition to the method 500 described above. For example, FIG. 6 illustrates a method 500 for modifying the system 400 shown above. The method 500 may also be provided with system 100*b* described above as well.

Figure 7A:
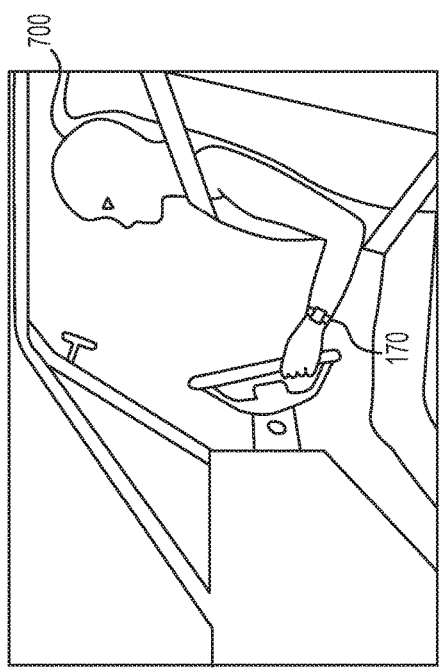
FIGS. 7(a)-(c) illustrate a use case of the method described in FIG. 6.
Figure 7C:
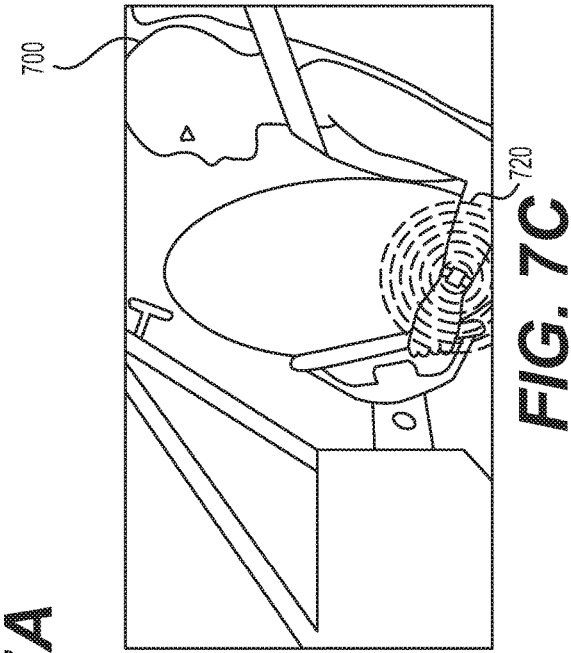
Figure 7B:
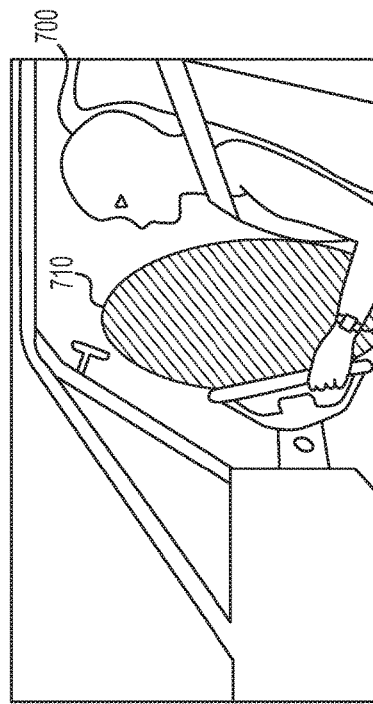

In operation 610, the ADAS alert is received. Instead of generating a notification, the ADAS is determined to be in a predetermined category of alerts 620). For example, one such alert may be the deployment of an airbag. As shown in FIGS. 7(*a*) and (*b*), when the airbag 710 deploys, an ADAS alert 131 is generated and communicated to the wearable device 170.

If the answer to the determination in operation 620 is no, the method 600 proceeds to end (640).

In operation 630, the wearable device 170 is configured to initiate a communication with a third-party, such as an emergency responder. As such, the emergency responder may be notified that the vehicle associated with the systems disclosed herein is in an accident or a deleterious condition.

In FIG. 7(*c*), the example based on an implementation is further illustrated. A signal 720 is sent from the wearable device 170 in response to receiving the ADAS alert 131. The wearable device 170 may interface with the telematics ECU 110 to initiate contact with the emergency responder, interface with a mobile device 160 to initiate contact with the emergency responder, or interface with the telematics ECU 110 to initiate contact with the mobile device 160 for the same.

In another example (not shown), the wearable device 170 may issue vocal prompts that requests the passenger 700 to initiate vocal commands to contact various third-parties, including emergency responders.

Thus, in cases where the passenger 700 may not be able to move (due to being pinned by the airbag 710, or injured from an accident), an emergency responder may be notified or contacted based on the aspects disclosed herein.

Certain of the devices shown include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIGS. 2(*a*), (*b*), 5 and 6. The disclosed devices, components, and systems contemplate using or implementing any suitable technique for performing the steps illustrated in these figures. Thus, FIGS. 2(*a*), (*b*), 5 and 6 are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

I claim:

1. A system for managing an alert for a wearable device in a vehicle, the system comprising:
   a data store comprising a non-transitory computer readable medium storing a program of instructions for the managing of the alert;
   a processor configured to execute the program of instructions to perform a process, the process comprising:
   receiving a message based on a sensed parameter associated with the vehicle;
   determining whether the message is an advanced driver assistance system (ADAS) alert type;
   in response to the message being of the ADAS alert type, generating an ADAS alert;
   transmitting the ADAS alert to the wearable device, the wearable device being configured to be worn by an occupant in the vehicle, wherein the wearable device is configured to receive the ADAS alert from the system, determine whether the ADAS alert is a message of the ADAS type, in response to the message being of the ADAS type, generating a notification via the wearable device, and in response to the message being not of the ADAS type, the wearable device is placed in a state to receive a subsequent message.

2. The system according to claim 1, the process further comprising:
   prior to transmitting the ADAS alert, determining whether the wearable device and the vehicle are in a pairing relationship; and
   in response to being in the pairing relationship, transmitting the ADAS alert, and
   in response to not being in the pairing relationship, not transmitting the ADAS alert.

3. The system according to claim 1, the process further comprising:
   prior to transmitting the ADAS alert, determining whether the ADAS alert is predefined as a transmittable message, and
   in response to the ADAS alert being a predefined transmittable message, transmitting the ADAS alert, and
   in response to the ADAS alert being not a predefined transmitting message, not transmitting the ADAS alert.

4. The system according to claim 1, wherein the wearable device is configured to be worn on a wrist of the occupant of the vehicle, wherein the occupant is a passenger of the vehicle.

5. The system according to claim 1, wherein upon receiving the ADAS alert, the wearable device is configured to provide a haptic notification.

6. The system according to claim 1, wherein upon receiving the ADAS alert, the wearable device is configured to provide a sound notification.

7. The system according to claim 1, wherein upon receiving the ADAS alert, the wearable device is configured to provide a visual notification.

8. The system according to claim 1, wherein only data of an ADAS alert type is transmitted to the wearable device.

9. A system for embedding in a wearable device, to manage an alert message received from a vehicle's electronic system, the system comprising:
   a data store comprising a non-transitory computer readable medium storing a program of instructions for the managing of the alert message;
   a processor configured to execute the program of instructions to perform a process, the process comprising:
   receiving a message from the vehicle's electronic system, wherein the electronic system is configured to receive a message based on a sensed parameter associated with the vehicle, determine whether the message is an advanced driver assistance system (ADAS) alert type, in response to the message being of the ADAS alert type, generate the ADAS alert in the message, and transmit the message;
   determining whether the message is of the ADAS type;
   in response to the message being of the ADAS type, generating a notification via the wearable device, and
   in response to the message being not of the ADAS type, the system being placed in a state to receive a subsequent message, wherein the receiving the message comprises receiving the ADAS alert transmitted to the wearable device, the wearable device being configured to be worn by an occupant in the vehicle.

10. The system according to claim 9, wherein the notification is a haptic notification.

11. The system according to claim 9, wherein the notification is a sound notification.

12. The system according to claim 9, wherein the notification is a visual notification.

13. The system according to claim 9, wherein the wearable device is configured to be worn around a wrist of a passenger of the vehicle.

14. The system according to claim 9, wherein the ADAS alert is generated in response to a deployment of an airbag, and the notification instigates a communication to a third-party.

15. The system according to claim 14, wherein the third-party is an emergency responder.

16. A method for receiving advanced driver assistance system (ADAS) type messages, comprising:
receiving a message from the vehicle's electronic system, wherein the electronic system is configured to receive a message based on a sensed parameter associated with the vehicle, determine whether the message is an advanced driver assistance system (ADAS) alert type, in response to the message being of the ADAS alert type, generate the ADAS alert in the message, and transmit the message;
determining whether the message is of the ADAS type;
in response to the message being of the ADAS type, generating a notification via the wearable device, and
in response to the message being not of the ADAS type, the system being placed in a state to receive a subsequent message,
wherein the receiving the message comprises receiving the ADAS alert transmitted to the wearable device, the wearable device being configured to be worn by an occupant in the vehicle, and
wherein the determining whether the message is of an ADAS type comprises determining whether the ADAS alert message is of a predefined category, and
wherein the generating comprises, in response to the ADAS alert message being of the predefined category, initiating a communication with a third-party, wherein the communication comprises the notification.

17. The method according to claim 16, wherein the predefined category includes a deployment of the vehicle's airbag.

18. The method according to claim 17, wherein the initiating of the communication is contingent on the wearable device being configured to pair with a mobile device capable of network communication with the third-party.

19. The method according to claim 16, wherein the third-party is an emergency responder.

* * * * *